Figure 2:
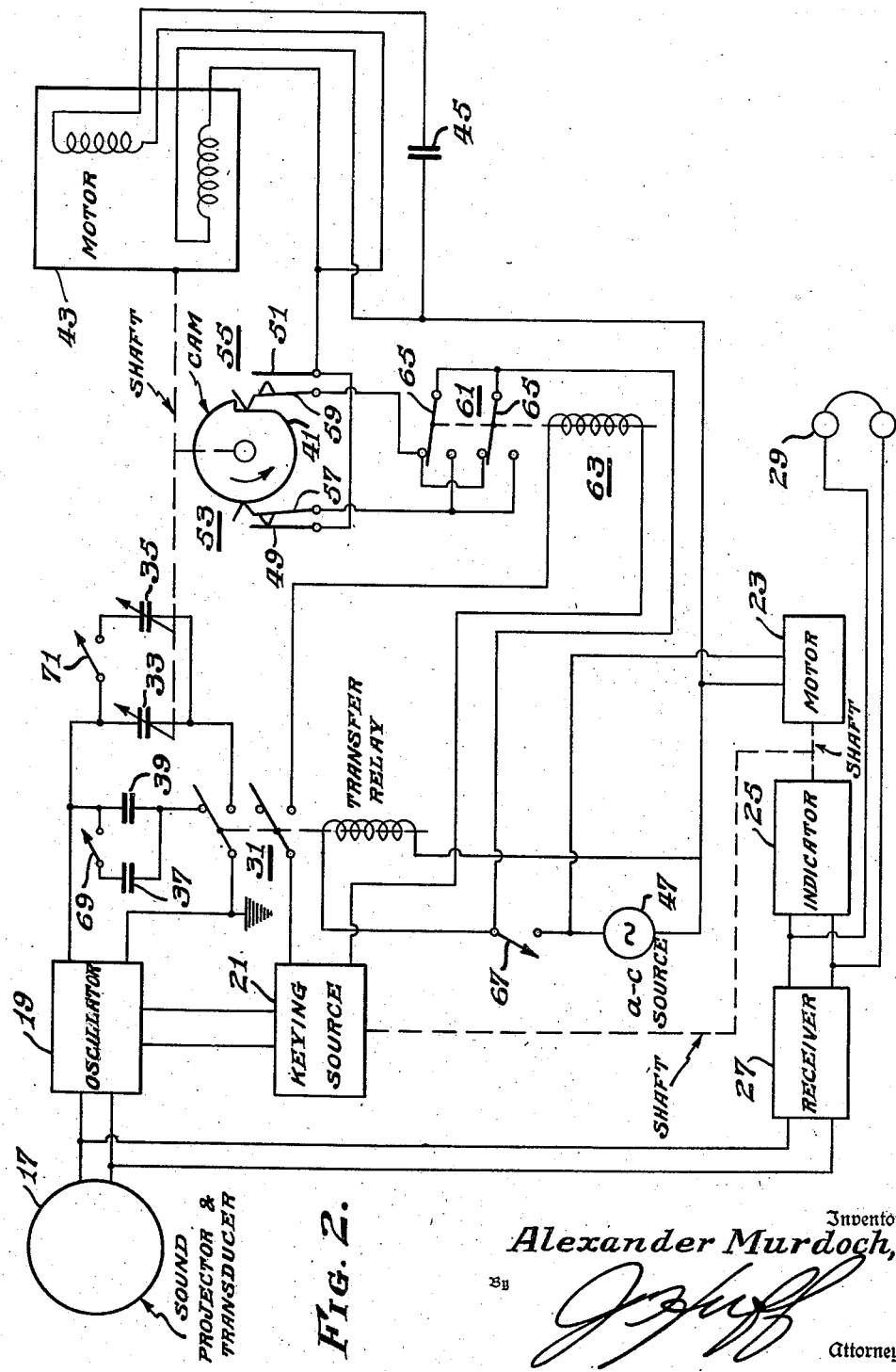

Dec. 30, 1947.    A. MURDOCH, JR    2,433,782
FREQUENCY SWEEP MODULATOR
Filed Oct. 2, 1939    2 Sheets-Sheet 1
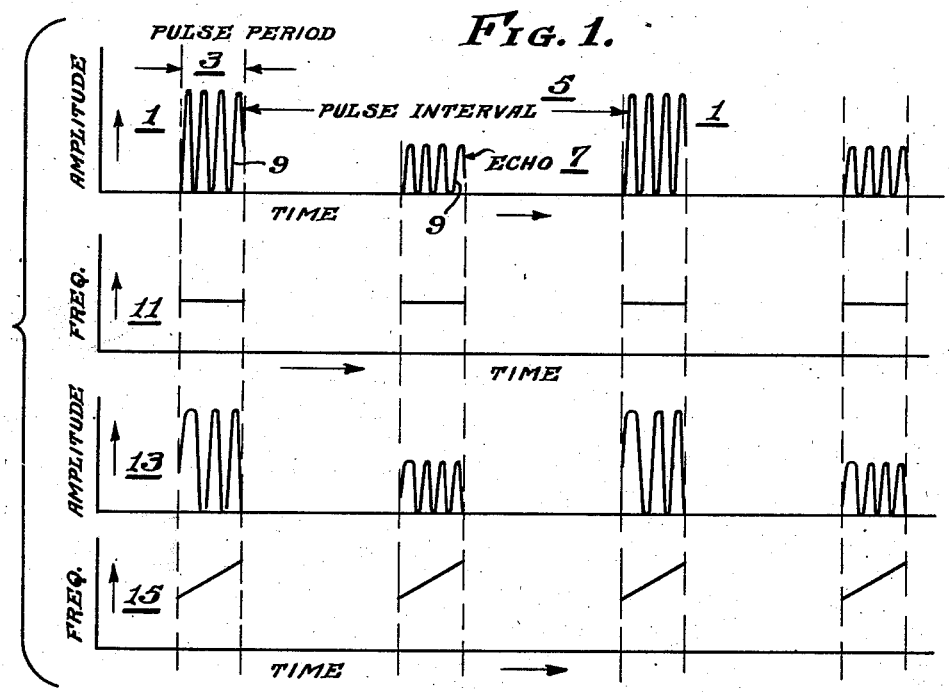
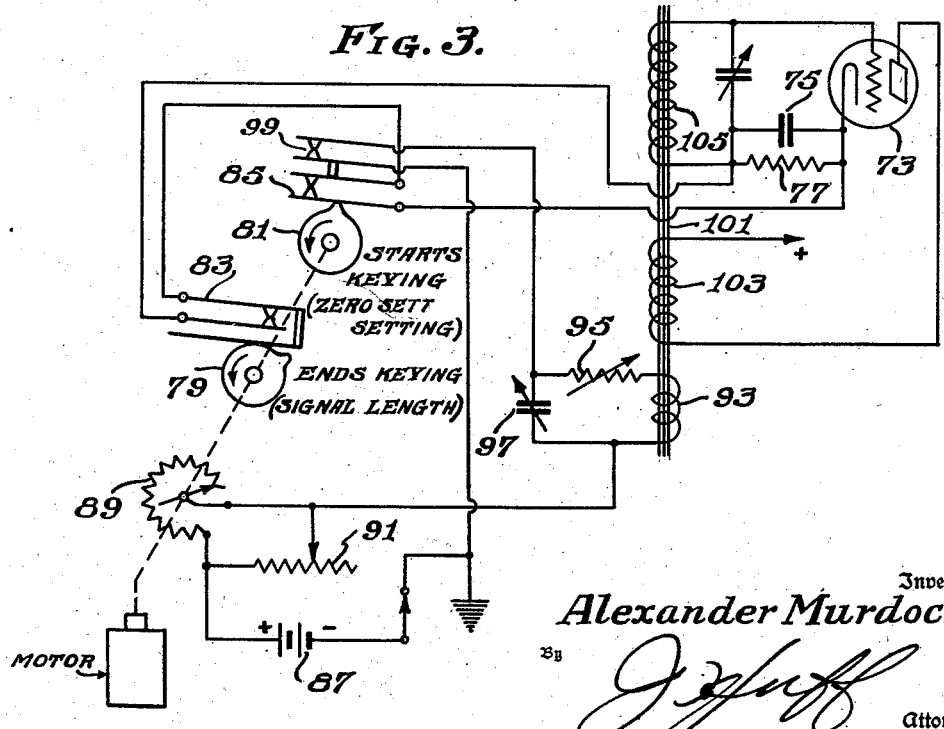
Inventor
Alexander Murdoch, Jr.
By
Attorney Patented Dec. 30, 1947

2,433,782

UNITED STATES PATENT OFFICE 2,433,782

FREQUENCY SWEEP MODULATOR

Alexander Murdoch, Jr., Philadelphia, Pa., assignor to Radio Corporation of America, a corporation of Delaware Application October 2, 1939, Serial No. 297,601

6 Claims. (Cl. 179—171.5)

This invention relates to frequency sweep modulators, and especially to a device for varying the frequency of a pulse signal.

Pulse signals are often used to locate a signal reflecting object. In some systems, the object is located by triangulation; in other systems, the distance of the object is determined by observing the time required for the signal to travel from the transmitter to the reflecting object and back to a suitable receiver. In such distance measuring systems, sharply defined pulses are transmitted at intervals of the order of twice the time required for the pulse to travel the maximum range of the device. In some types of devices, supersonic frequencies are used. When the received signals are weak, it is difficult to distinguish the pulse echo signals from signals caused by reverberations and other interfering sounds. If the pulse signal frequency is varied, the received signal is heard as a musical note which can be distinguished from the non-musical interference.

The present invention has for one of its objects the provision of means for modulating the frequency of a pulse. Another object is to provide means for modulating the frequency of a pulse in synchronism with the generation of the pulse. Another object is to provide means for sweeping the frequency of a pulse through a desired range by means of an electronic device.

The invention will be described by reference to the accompanying drawings in which Figure 1 is a graph illustrating unmodulated and modulated pulse characteristics, and Figures 2 and 3 are schematic circuit diagrams embodying the invention.

Referring to Fig. 1, in the prior art systems, pulse signals 1, having a pulse period 3, are transmitted at intervals 5. The reflected or echo signals 7 are of smaller amplitude. The pulses are composed of a number of waves 9, preferably of supersonic frequency. The wave frequency is constant during the pulse periods as illustrated in the second portion 11 of the graph. According to the present invention, the frequency of the waves is increased during each pulse, as shown in the third portion 13 of the graph. The nature of the frequency increase is illustrated in the fourth portion 15 of the graph.

While only a few waves have been shown, it should be understood that any desired number of waves may be radiated. Furthermore, the frequency may be increased or decreased, and the rate of frequency change may be linear or nonlinear. It is preferable to synchronize the frequency sweep with the beginning of each pulse, and to have the receiving device responsive to a frequency within the sweep.

Referring to Fig. 2, a sound projector and transducer 17 is connected to an oscillator 19 which is keyed by a keying source 21. The keying source is mechanically operated by a motor 23. The motor is also used to drive an indicator 25. The indicator is connected to the output of a receiver 27 whose input is connected to the transducer 17. Telephone receivers 29, or other acoustic signal devices, are connected to the receiver output.

In the operation of the system, the keying source determines the pulse length and pulse intervals. The oscillator determines the wave frequency. The waves are projected from the sound projector and, after reflection, are received thereon and converted into electric waves, which are received, demodulated and amplified by the receiver 27. The received audio pulses may be heard in the receivers and observed on the indicator, as is known to those skilled in the art.

The sweep modulator is connected as follows: a double pole-double throw relay operated switch 31 is arranged so that variable capacitors 33, 35 are substituted for the fixed capacitors 37, 39 of the oscillator. The capacity of the fixed capacitors preferably equals the average capacity of the variables. The variable capacitor shaft is connected to a cam 41 and a motor 43. The motor is preferably of the split-phase type in which a capacitor 45 is connected in series with one of the windings to provide the phase shift for starting. The rotor is preferably constructed of a permanent magnet material and is arranged to form a large number of permanent field poles. These poles insure rotation at a speed synchronous with the rotation of the electrical field of the stator and provide quick starting and stopping of the motor.

The motor connections are as follows: one terminal of each field winding is connected to one terminal of the A.-C. source 47. The other terminals of the field windings are connected together and to the fixed terminals 49, 51 of switches 53, 55. The movable terminals 57, 59 are connected, respectively, to the fixed terminals of a double pole-double throw switch 61, which is operated by a relay 63. The relay is connected to the keying source. The movable terminals 65 of the switch 61 are joined together and connected to the other terminal of the A.-C. source.

The operation of the sweep modulator circuit is as follows: The relay operated switch 31 connects the variable capacitors 33, 35 to the oscillator when the power circuit switch 67 is closed. When a keying pulse is applied from the keying source 21, the relay 63 is closed. The relay 63 connects the A.-C. power source 47 through the switch 53 to the motor 43. The motor starts, almost instantaneously, and drives the variable capacitors through the desired tuning range, and also drives the cam 41 in a counter-clockwise position. At the end of the keying pulse, the relay 63 will release the movable contacts of switch 61. The movable contacts 65 then connect the power source through the switch 55 which has been closed by the cam 41. During the keying pulse the shaft of the variable capacitors has been rotated so that the capacitors have changed from maximum to minimum capacitor. The motor will continue to drive the cam and variable capacitor shaft until the cam and variable capacitors have been restored to their initial position, at which position the cam opens switch 55, and stops the motor. At the initial position switch 53 is closed and the sweep modulator is again ready to sweep the oscillator frequency in synchronism with the next keying pulse. The switches 69, 71 in the capacitor circuits 33, 35 and 37, 39 are used to provide two sweep ranges.

In a modification, illustrated in Fig. 3, the oscillator frequency is varied by electronic means. The oscillator 73 includes a grid capacitor 75 and a resistor 77 which biases off the oscillator during keying intervals. The keying period and keying intervals are determined by motor driven cams 79, 81. The cams, which are relatively adjustable, drive switches 83, 85. The switches 83, 85 are connected in series and hence to the resistor 77. The upper cam operated switch 81, 85 determines the start of the keying; the lower switch 83 determines the end of the keying pulse; and the motor speed determines the pulse rate.

A battery 87 is connected to variable resistors 89, 91 which are connected in parallel. The resistors are connected to a circuit including an inductor 93, resistor 95, and capacitor 97. The connection continues from the circuit 93, 95, 97 through a switch 99, operated by the cam 81, back to the battery 87. The inductor 93 is positioned on the magnetic core 101 which couples the oscillator inductors 103, 105. One of the resistors 89 is connected to the motor operating the cams and is varied in synchronism therewith.

The operation is as follows: First, assuming that the battery 87 is disconnected, the closing of the first and second cam operated switches 81, 83 starts the oscillator. The signal length is determined by the opening of the second switch 83. Now, assuming that the battery 87 is connected, currents will flow through the inductor 93 and thus the frequency of the oscillator 73 will be varied during the keying pulse. It is desirable to have the oscillator frequency variation the same for short and long pulses so that the oscillator frequency will always sweep through the same resonant frequency which is generally the frequency of the receiver. The variable resistors 89, 91, along with the time constant of the circuit 93, 95, 97, are adjusted so that the variation of the oscillator frequency may be synchronized with the keying pulse, and may be arranged to cover a uniform frequency sweep. In this connection, it should be understood that equivalent means for varying the frequency of the oscillator or generator are within the scope of the invention. Once the adjustment has been made, the cam operated resistor will automatically synchronize and adjust the sweep frequency to the pulse period.

Thus the invention has been described as a sweep frequency modulator in which the frequency of a generator or oscillator is varied during a keying pulse of short duration. The variation is preferably synchronized with the keying pulse so that the sweep covers the same range, and so that the frequency of the oscillator is the same at the beginning and end of each pulse. This mode of operation insures the oscillator frequency passing through the resonant frequency of the receiver. It should be understood that the frequency sweep may be linear or exponential.

I claim as my invention:

1. A sweep modulator including a keying source, an oscillator connected thereto, means for varying the frequency of said oscillator, a motor for operating said frequency varying means, means for intiating energization of said motor at the start of each keying pulse, and means including said motor for restoring said frequency varying means to its initial position after the terminating of said of said keying pulse and for deenergizing said motor.

2. A sweep modulator including a pulse keying source, an oscillator connected thereto, frequency varying means connected to said oscillator, a motor for operating said frequency varying means, switches operated by said keying source, and additional switches operated by said motor, said switches being so connected that said motor is energized at the start of a keying pulse and de-energized after the completion of said pulse and after said frequency varying means is restored to its initial position.

3. A sweep frequency modulator including, in combination, a source of oscillations, a variable capacitor connected to said source for varying the frequency of said oscillations, keying means for keying said source on and off to establish a pulse of said oscillations, a motor for controlling said capacitor, switches operated by said motor and connected thereto arranged to open said motor circuit at a predetermined value of said variable capacitor, and means operated by said keying source for starting said motor in substantial synchronism with said pulse.

4. A sweep frequency modulator including, in combination, a source of oscillations, a variable capacitor connected to said source for varying the frequency of said oscillations, keying means for keying said source on and off to establish a pulse of said oscillations, a rapid self-starting synchronous motor for controlling said capacitor, switches operated by said motor and connected thereto arranged to open said motor circuit at a predetermined value of said variable capacitor, and means operated by said keying source for starting said motor in substantial synchronism with said pulse.

5. A sweep frequency modulator including, in combination a generator of alternating currents, a variable reactor connected to said generator for controlling the frequency of said currents, keying means for obtaining pulses of said alternating currents, a quick starting motor connected to said variable reactor, motor controlling switches connected to said motor for interrupting the operation of said motor at a predetermined position of said reactor, cams connected to said motor and reactor for operating said switches, and means responsive to said keying means for starting the operation of said motor in synchronism with said pulses.

6. A sweep frequency modulator including, in combination, a generator of oscillatory currents, means effectively connected to said generator for varying the frequency of said currents, a keying source connected to said generator for establishing pulses of said currents, and means responsive to said keying source and effectively connected to said generator for varying said frequency during each said pulse from an initial value and back again to said value and synchronized with said pulse.

ALEXANDER MURDOCH, JR.

REFERENCES CITED

The following references are of record in the file of this patent:

UNITED STATES PATENTS

| Number | Name | Date |
| --- | --- | --- |
| 2,011,392 | Bentley | Aug. 13, 1935 |